United States Patent [19]
Neal

[11] Patent Number: 4,726,313
[45] Date of Patent: Feb. 23, 1988

[54] MOORING BOATS

[76] Inventor: Harry Neal, 3019 Buckeye, Goshen, Ky. 40026

[21] Appl. No.: 725,245

[22] Filed: Apr. 19, 1985

[51] Int. Cl.$^4$ .............................................. B63B 21/00
[52] U.S. Cl. .......................................... 114/230; 441/3
[58] Field of Search ........................ 114/230, 219, 220; 405/224–227, 212

[56] References Cited

U.S. PATENT DOCUMENTS

| | | | |
|---|---|---|---|
| 3,170,299 | 2/1965 | Clarke | 114/230 |
| 3,430,598 | 3/1969 | Soderberg | 114/230 |
| 3,456,448 | 7/1969 | Luque | 405/224 |
| 3,486,342 | 12/1969 | Aks | 114/230 |
| 3,495,565 | 2/1970 | Gustavii | 114/230 |
| 4,357,891 | 11/1982 | Sluys | 114/230 |

Primary Examiner—Joseph F. Peters, Jr.
Assistant Examiner—Jesús D. Sotelo
Attorney, Agent, or Firm—Edward M. Steutermann

[57] ABSTRACT

Boat mooring devices to secure a boat or other floating object at a relatively fixed location on the surface of a body of water, which allow vertical movement of the boat, or floating object, in response to change in the water level where the boat is connected to at least one vertically extending shaft which extend upwardly above the surface of the water by ring-like floats having split sections so the boat can be connected to the rings and the shaft can be received through the split sections of the rings regardless of the height of the shaft. Closure devices are provided to retain the rings on the shafts for longitudinal movement thereon, but hold the boat in position and telescoping shafts are provided where the rings are attached adjacent the distal ends thereof so the shafts are extended and retracted in response to change in water level.

5 Claims, 8 Drawing Figures

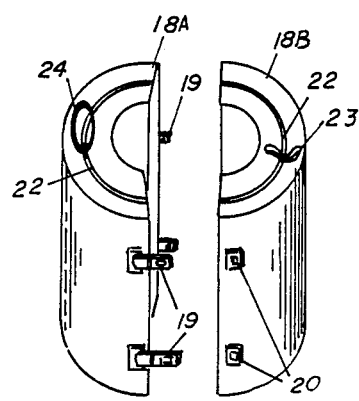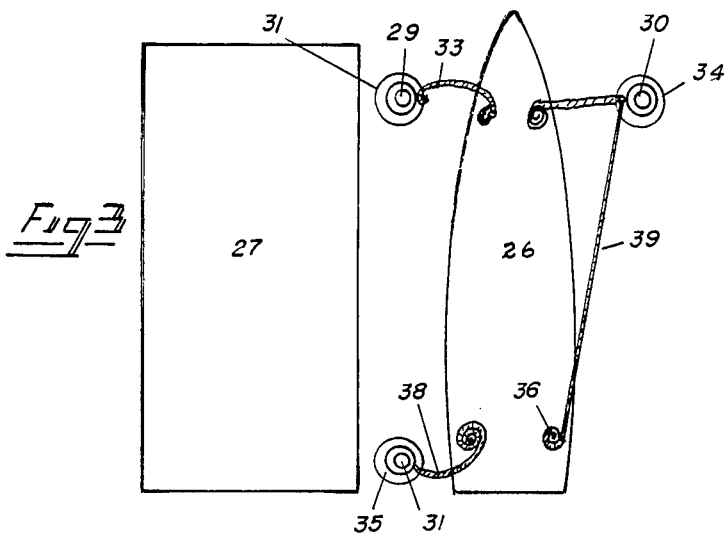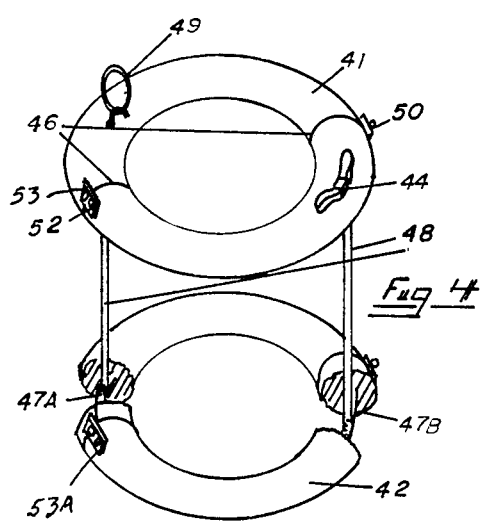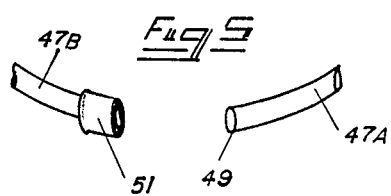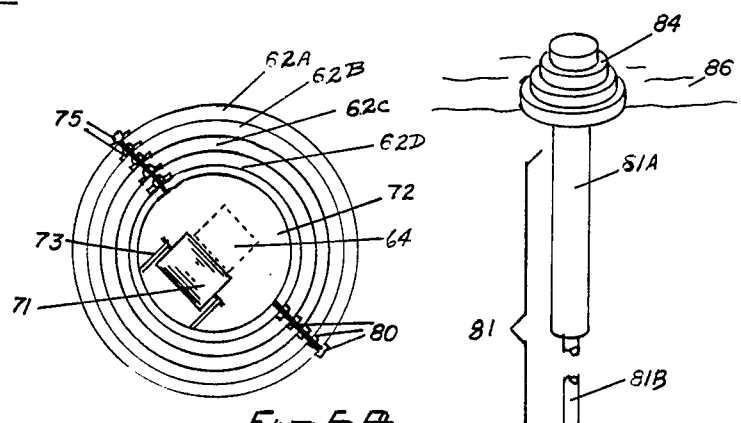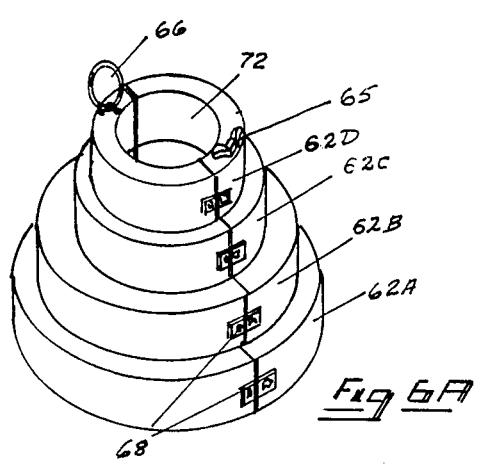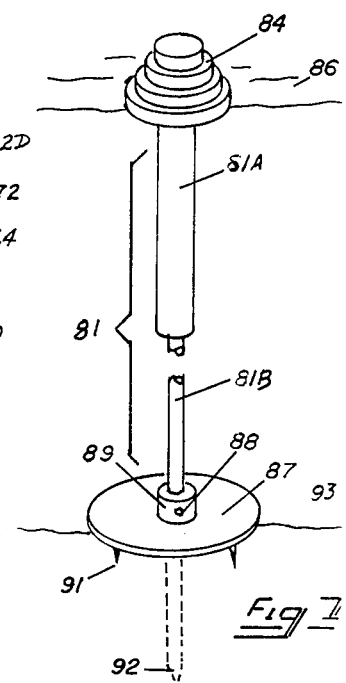

MOORING BOATS

BACKGROUND OF THE INVENTION

The present invention relates to devices for securing, or mooring boats on a water surface, in situations where the level of the water surface may vary from time to time as, for example, in rivers with flood control dams, lakes where the level of the water in the lake is periodically adjusted, stream where rapid changes in level occur, or even in control areas where the tide ebbs and flows.

Additionally, there are naturally occurring situations where water level changes rapidly, as for example in uncontrolled water ways, and where the use of fixed attachment for mooring a boat can leave the boat hanging out of the water when the water level drops, or can cause the boat to sink in the converse situation when the water level rises rapidly, and where the boat owner or tender does not have time to make adjustments in the moorings. In such instances it is necessary to frequently monitor changes in the water level and have someone on call to make adjustments in the moorings for the boats.

Prior art devices are known for mooring boats or other floating objects, and one example of such an arrangement is shown in U.S. Pat. No. 3,430,598 where a floating arrangement is provided with a disc adapted to longitudinally receive a shaft at each end of a boat so that the boat can rise and fall with changes in the level of the water. In the arrangements shown in the reference the discs are intended to be permanently received by the shaft and no means is provided for removal fo the disc from the shafts other than by lifting the disc over the free ends of the shafts. Further, the shafts disclosed by the reference are intended to be sunk into the bottom below the water level and provide no means for securing the shaft other than the depth to which the shaft is sunk in the bottom. Further, no suggestion is provided for means of lengthening or otherwise securing the shafts to the bottom below the water level.

Another mooring arrangement is shown in U.S. Pat. No. 4,067,283 where a pivotable device is shown to receive and hold a boat.

Other mooring devices are shown in U.S. Pat. Nos. 2,912.953; 2,983,243; Re. 27,050; 3,993,013; 4,309,954.

However, none of the arrangements taught by the prior art references, describe the features or advantages provided by the Applicant's invention as set out hereinafter.

Specifically, none of the prior art references teaches a mooring device including a shaft extending upwardly from the surface of a body of water upon which the floating object to be moored is located, where a split ring is provided with the split being wide enough to receive the shaft therethrough and where locking means are provided to secure the ring around the shaft yet allow longitudinal movement of the ring with respect to the shaft so that the floating object can be retained on the shaft.

Moreover, none of the prior art references teach, or suggest arrangements to allow adjustments of the height of the shaft in response to change in the level of the water or provide means to facilitate the movement of the ring on the shaft as now disclosed hereinafter.

SUMMARY OF THE INVENTION

The present invention relates to a new, useful, and inexpensive means for mooring a boat to a selected location on the surface of a body of water which allows the boat to rise and fall with change in the level of the water yet retain the boat in a preselected position either adjacent to the dock or in the middle of the body of water.

Further, devices within the scope of the present invention permit the mooring of a boat to vertically extending shafts where the entire device can be selectively placed on and removed from the bottom below the level of the water, or the device can be permanently installed. Further, the mooring means (an example of which being mooring rings) can be removed from the shaft through splits cooperatively provided in the ring where the ring can either be pivoted or a permanent slit can be provided in the ring with a cooperative clasp to retain the ring about the shaft.

Additionally, devices within the scope of the present invention can be adapted to provide telescoping shafts which can be extended upwardly or retracted as needed in response to changes in the water level where the ring can be mounted to the shafts to facilitate vertical movement of the telescoping shafts.

Additionally, the present invention recognizes that in certain applications, particularly where a deep sandy bottom is provided, there is some likelihood that the shaft may sink into the sand beyond the top of the shaft and thus be lost.

Accordingly, the present invention provides arrangements to prevent loss of the [mooring] shaft by sinking into the bottom.

More particularly, the present invention provides boat mooring devices to secure a boat or other floating object at a relatively fixed location on the surface of a body of water, allowing vertical movement of the boat, or floating object, in response to change in the water level where the boat is connected to at least one shaft which extends vertically upward above the surface of the water. The extending shaft is supported above the water's surface by floatable mooring means, such as floatable rings having split sections so the boat can be connected to the rings and the shaft can be received through the split section of the rings regardless of the height of the shaft. Closure means, such as clasps or the like, are provided to retain the rings on the telescoping shafts allowing vertical movement of the telescoping shafts as the rings move vertically in conjunction with the surface of the water allowing the boat to remain in the selected position. The rings are attached to the end of the telescoping shafts providing above the surface of the water allowing the telescoping shafts to extend and retract in response to the surface water level.

Various examples within the scope of the present invention are illustrated in the drawings included herewith and discussed hereinafter and it will be understood that the examples are by way of illustration only and not by way of limitation and that various other arrangements also within the scope of the present inventionw ill occur to those skilled in the art upon reading the disclosure set forth hereinafter.

BRIEF DESCRIPTION OF THE DRAWINGS

In the example in accordance with the present invention shown in the accompany FIGS:

FIG. 2 illustrates another mooring ring assembly within the scope of the present invention;

FIG. 3 is an illustration of a useful docking method utilizing devices within the scope of the present invention;

FIG. 4 is another example of a mooring ring assembly within the scope of the present invention;

FIG. 5 is an example of a closure system useful in connection with the arrangement shown in FIG. 4;

FIGS. 6A and 6B illustrate other mooring rings arrangements within the scope of the present invention; and FIG. 7 is an illustration of another example of a mooring assembly and shaft within the scope of the present invention.

DETAILED DESCRIPTION OF THE DRAWINGS

Figure 1:
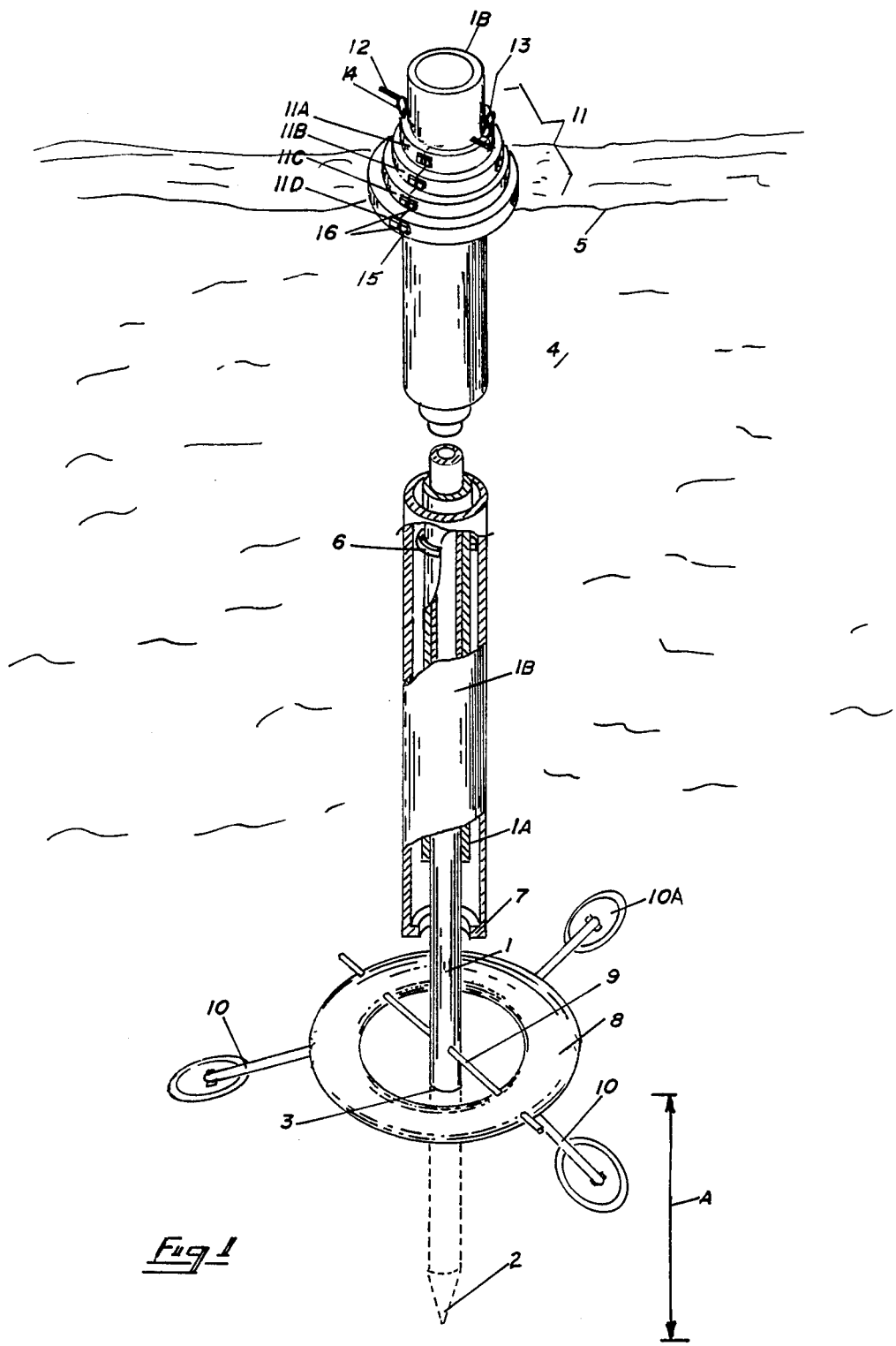
FIG. 1 is an perspective view partially in section of one arrangement within the scope of the present invention.

Referring to FIG. 1 which shows one arrangement within the scope of the present invention, including a shaft, for example a cylindrical shaft 1 is provided having a pointed end 2 which is embedded in the soil beneath the bottom 3 of a body of water and the surface 5.

Within the scope of the present invention, shaft 1 can be a telescoping shaft including telescoping elements 1A and 1B as shown where the center element 1A has a ring 6 surrounding it at a selected location as shown. Element 1B has a stop 7, in this case a ring at the lower end so as element 1B rises in response to movement of a float assembly 11 carried by shaft 1 B as described hereinafter the shaft telescopes.

It has been found that in certain arrangements, particularly where a sandy bottom is provided below a body of water, the shaft, for example shaft 1, can be embedded to a selected depth, for example A as illustrated in FIG. 1, but that movement of the shaft by the water or other sources can cause further embedding of the shaft so that eventually the shaft will disappear below the surface of the water.

Accordingly, in accordance with one feature of the present invention means can be provided to prevent further embedding of the shaft. Examples of such arrangements to prevent such embedding are shown in FIGS. 1 and 7. In FIG. 1 a ring 8 is provided with a pin 9 extending laterally through shaft 1 and the ring 8 to hold the ring in place. Ring 8 can be utilized as shown in FIG. 1 or legs 10 can be extended from the ring 8 with feet 10A located on the distal ends thereof to prevent "rocking" of the shaft. The arrangement shown in FIG. 1 has been found to provide a particularly stable arrangement.

Also within the scope of the present invention mooring rings can be adapted to be fitted onto the shaft extending vertically from the water and move longitudinally thereon as described hereinafter. In FIG. 1 a mooring ring assembly 11 is provided having multiple rings 11A-11D which need not be fastened to shaft 1B but can be retained thereon by a pin 12. Eyelets 13 or cleats 14 can be provided to receive a rope from a boat to be moored. The ring assembly 11 is lighter than the water and floats on the surface 5. In accordance with one feature of the arrangement shown in FIG. 1, pin 12 extends through the free end of shaft 1B to hold the shaft so that the ring 11 flaots on the surface 5 until the water level rises so that ring 11 engages pin 12 at which time the shafts 1A and 1B telescope on shaft 1 so that the ring 11 is always on the surface of the water and available for mooring the craft or object to be tied down by means of ring 13 or cleat 14 so that the craft is free to rise with the rising water. Also float rings similar to rings 11A-11D can be added or removed as necessary to provide the bouyancy necessary to telescope the shaft assembly 1, 1A, 1B or to allow the float assembly 1 to extend further above the water for easy sighting.

Additionally, the rings 11A-11D each can include a clasp assembly 15 which permits the rings to be opened along slits 16, either by a hinge (not shown) or a second clasp assembly (also not shown) located on the side opposite slits 16 so it is not necessary to remove pin 12 to add or remove floats.

Referring now to FIG. 2, a ring is illustrated having 2 halves 18A, and 18 B which could be utilized with a shaft of the type shown in FIGS. 1 and 7 or could be connected around a tree or a post or the like.

In FIG. 2 the ring, which of course is of a material lighter than water so that it will float on the surface of the water, is shown in halves. While the arrangement shown in FIG. 2 is shown in halves it will be understood that the present invention works equally well where a split ring is provided where an opening is provided in the circumference of the ring to admit the ring to a shaft and a closure means is provided to prevent escape of the ring from the shaft.

Again referring to FIG. 2, the two halves 18A and 18B of the ring are shown in separated condition with cooperative clasps 19 and receiving elements 20 located on opposite sides unlatched. A cleat 23 is shown and carried by a ring 22 which is available on both of the halves 18A and 18B and a mooring ring 24 is shown on the other half. It will be understood that in use the two halves 18A, 18B would be connected with clasps 19 and receiving elements 20 so that a circular ring is provided and a shaft (not shown) is located therethrough.

Referring now to FIG. 3, an arrangement for docking a boat is shown, where shafts 29, 30 and 37 are illustrated. Rings 31, 34 and 35 in accordance with the present invention are receptively provided around shafts 29, 30 and 37 and ropes 33 and 38 are connected to the rings 31 and 35 and to the boat 26 to be moored adjacent the dock 27. A third rope 39 is connected at the bow end to the craft, then to the ring 34 and to a cleat 36 at the stern of the boat to provide docking. In the arrangements shown the rings 31 and 35 may also be provided as bumpers to prevent damage to the boat in the event of rough weather.

Referring now to FIG. 4, a second ring assembly within the scope of the present invention is illustrated but it will be understood that various other arrangements within the scope of the present invention are also available.

In the arrangement shown in FIG. 4 an upper ring 41 and a lower ring 42 are provided where the rings can be divided into halves as shown and held together by clasp assemblies 52, 53. The rings 41, 42 can be made of Styrofoam or any material having a specific gravity less than water where metallic rings 47 are provided within the ring structures 41 and 42 to provide strength and to connect the posts 48 which extend between the rings 41, 42 and provide means for tying the boat rope to the device. Alternatively a cleat 44 can be provided and connected to ring 47 located in the ring 41.

Hinges 50 are provided on one side of the rings 41, 42 and clasp assemblies 52 and 53 are provided on the opposite side to close the rings. Also the rings 47 can be provided with a structure as shown in FIG. 5 where a socket 51 is provided at the end 47B of one segment of the ring 47 and a post 49 is provided on the cooperative opposite side of side 47A of the ring 47 so that the post 49 is received in socket 51 to assure alignment and secure connection of the halves of the ring.

FIGS. 6A and 6B illustrate another ring arrangement within the scope of the present invention where generally rings 62–66 are provided to surround a shaft 74. Clasp means 68 are provided to connect the ring halves as previously described and cleats 69 and mooring rings 70 can also be provided.

In accordance with another feature of the present invention, as shown in FIG. 6B, a roller member 71 can be provided inside the aperture 72 defined by the ring members where roller member 71 is carried by journal 73 for rotation. The purpose of the arrangement shown in FIGS. 6A and 6B is, for example, to allow lateral movement of the mooring ring along the vertical axis of shaft 74 as the boat rises and falls with the surface water level.

FIG. 7 is another arrangement within the scope of the present invention where a shaft 81 having telescoping sections which are similar to the shaft assembly 1, 1A, 1B of FIG. 1 are provided and where a ring 84 assembly within the scope of the present invention, is fixed to an upper section of shaft 81 so that the ring always rides on the surface 86 of the water. A lower section of shaft 81 is received in a foot 87 where the position of foot 87 can be adjusted on the shaft 81 by means of a set screw 88. The foot 87 includes outwardly extending flange member 89 having cleats 91 in the bottom thereof and the shaft 81 includes a point 92 to be driven into the bottom beneath the surface 93.

The arrangement shown in FIG. 7 is particularly useful to be carried in a boat for mooring the boat, for example, when the boat is utilized in an estuary or river to provide the benefit of mooring the boat at a given location in selectively variable depths of water.

It will be understood that the foregoing descriptions are by way of illustration only and that various other arrangements within the scope of the present invention will occur to those skilled in the art upon reading the disclosure set forth hereinbefore.

What is claimed is:

1. Mooring means to secure a floating object at a relatively fixed location on the surface of a body of water including at least one vertically extending shaft means which extends upwardly above the surface of the water, ring-like float means composed of split sections so said shaft means can be received between the split sections of said ring-like float means regardless of the height of said shaft means, fastener means to releasably hold said split sections together whereby said ring-like float means are attached to said shaft means above said surface of a body of water and wherein said shaft means is telescoping shaft means to be extended and retracted in response to the position of said ring-like float means as said ring-like float means moves upwardly or downwardly on said surface of said body of water such that said shaft means is extended and retracted in response to change in the water level of said surface of a body of water thereby maintaining a portion of said ring-like float means on said surface of said body of water.

2. The invention of claim 1 including base means resting on the bottom of said body of water.

3. The invention of claim 2 wherein said base means includes ring means surrounding said shaft means and connected thereto by rod means.

4. The invention of claim 1 including bearing means on the inner surface of said ring-like float means to facilitate movement of said ring-like float means on said shaft means.

5. Mooring means to secure a floating object at a relatively fixed location on the surface of a body of water including at least one vertically extending shaft means extending upwardly above the surface of the water, ring-like float means composed of split sections so said shaft means can be received through the split sections of said ring-like float means regardless of the height of said shaft means, fastener means to releasably hold said split sections together in mutual relation whereby said ring-like float means are attached to said shaft means above said surface of a body of water and wherein said shaft means is a telescoping shaft means to be extended and retracted in response to the position of said ring-like float means so said shaft means is extended and retracted in response to change in water level to maintain a portion of said float means on the surface of said water and including base means to rest on the bottom of said body of water wherein said base means includes ring means surrounding said shaft means and connected thereto by rod means.

* * * * *